United States Patent
Fujimoto

(10) Patent No.: US 11,377,146 B2
(45) Date of Patent: Jul. 5, 2022

(54) CONTROL DEVICE FOR VEHICLE

(71) Applicant: TOYOTA JIDOSHA KABUSHIKI KAISHA, Toyota (JP)

(72) Inventor: Asami Fujimoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 16/731,233

(22) Filed: Dec. 31, 2019

(65) Prior Publication Data

US 2020/0269913 A1 Aug. 27, 2020

(30) Foreign Application Priority Data

Feb. 26, 2019 (JP) .............................. JP2019-033019

(51) Int. Cl.
*B62D 6/00* (2006.01)
*B62D 5/00* (2006.01)

(52) U.S. Cl.
CPC .............. *B62D 6/008* (2013.01); *B62D 5/003* (2013.01); *B62D 5/006* (2013.01)

(58) Field of Classification Search
CPC ...... B62D 5/003; B62D 5/006; B62D 5/0484; B62D 6/008
See application file for complete search history.

(56) References Cited

U.S. PATENT DOCUMENTS

| | | | | |
|---|---|---|---|---|
| 7,130,728 | B2 * | 10/2006 | Suzuki | B60T 8/885 701/41 |
| 8,762,005 | B2 * | 6/2014 | Limpibunterng | B62D 5/008 701/42 |
| 9,174,667 | B2 * | 11/2015 | Suzuki | H02P 5/747 |
| 2006/0200289 | A1 * | 9/2006 | Chino | B62D 5/006 701/41 |
| 2011/0297473 | A1 * | 12/2011 | Krahn | B62D 5/091 180/422 |
| 2013/0253766 | A1 * | 9/2013 | Kimura | B62D 5/046 701/41 |

(Continued)

FOREIGN PATENT DOCUMENTS

| | | | | |
|---|---|---|---|---|
| EP | 1481874 | A2 * | 12/2004 | ............... B62D 6/10 |
| JP | 2003-002223 | A | 1/2003 | |
| JP | 2004-291846 | A | 10/2004 | |

*Primary Examiner* — Hunter B Lonsberry
*Assistant Examiner* — Daniel L Greene
(74) *Attorney, Agent, or Firm* — Sughrue Mion, PLLC

(57) ABSTRACT

A steer-by-wire type vehicle includes actuators operated by electric power supplied from a power supply device. The actuators include a turning actuator for turning a wheel and a reaction actuator for applying a reaction torque to a steering wheel. The power supply device includes a main power supply and a backup power supply. A control device for the vehicle executes turning control that turns the wheel by controlling the turning actuator according to a steering operation of the steering wheel. When the electric power is supplied from the main power supply to the actuators, the control device executes reaction torque control that applies the reaction torque to the steering wheel by controlling the reaction actuator according to the steering operation. When the electric power is supplied from the backup power supply to the actuators, the control device executes power suppression processing that stops control of the reaction actuator.

7 Claims, 7 Drawing Sheets

(56) References Cited

U.S. PATENT DOCUMENTS

| | | | |
|---|---|---|---|
| 2015/0137706 A1* | 5/2015 | Nagashita | H02M 3/33584 315/307 |
| 2015/0246683 A1* | 9/2015 | Kuramochi | B62D 5/003 701/43 |
| 2015/0249406 A1* | 9/2015 | Koseki | H02M 1/08 318/400.27 |
| 2016/0075370 A1* | 3/2016 | Itamoto | B62D 5/0493 701/41 |
| 2016/0200355 A1* | 7/2016 | Mori | H02H 7/0844 180/446 |
| 2016/0229445 A1* | 8/2016 | Sasaki | B62D 5/046 |
| 2016/0339949 A1* | 11/2016 | Mori | H02P 29/028 |
| 2018/0079448 A1* | 3/2018 | Kodera | B62D 15/021 |

* cited by examiner

CONTROL DEVICE FOR VEHICLE

BACKGROUND

Technical Field

The present disclosure relates to a control device for a vehicle of a steer-by-wire type.

Background Art

Patent Literature 1 discloses a steering device of a vehicle of a steer-by-wire type. The steering device is provided with a turning actuator that turns a wheel according to rotation of a steering wheel and a reaction actuator that applies a reaction torque to the steering wheel.

Patent Literature 2 discloses a steering device of a vehicle. The steering device is provided with a turning motor for turning a wheel and a plurality of power supplies. The steering device determines a turning output according to a steering input given to a steering wheel, and controls the turning motor such that the turning output is achieved. The plurality of power supplies include a turning-dedicated power supply that supplies electric power to the turning motor and a vehicle power supply that supplies electric power to electric components other than the turning motor. When an abnormality occurs in the turning-dedicated power supply, the vehicle power supply is used as a backup and the electric power is supplied from the vehicle power supply to the turning motor.

LIST OF RELATED ART

Patent Literature 1: Japanese Laid-Open Patent Application Publication No. JP-2003-002223
Patent Literature 2: Japanese Laid-Open Patent Application Publication No. JP-2004-291846

SUMMARY

A vehicle of a steer-by-wire type includes a turning actuator that turns a wheel and a reaction actuator that applies a reaction torque to a steering wheel. The turning actuator and the reaction actuator are operated by electric power supplied from a power supply. It is conceivable to equip the vehicle with a backup power supply in preparation for occurrence of an abnormality in the power supply. However, when the same level of output as the normal power supply is required also for the backup power supply, a large backup power supply is necessary. Increase in size and weight of the backup power supply has an extensive influence on vehicle design and the like.

An object of the present disclosure is to provide a technique that can downsize a backup power supply installed on a vehicle of a steer-by-wire type.

A first aspect is directed to a control device for a vehicle of a steer-by-wire type.

The vehicle includes:
a power supply device; and
actuators operated by electric power supplied from the power supply device.

The actuators include:
a turning actuator configured to turn a wheel of the vehicle; and
a reaction actuator configured to apply a reaction torque to a steering wheel of the vehicle.

the power supply device includes:
a main power supply; and
a backup power supply configured to supply the electric power to the actuators when an abnormality occurs in the main power supply.

The control device is configured to execute:
turning control that turns the wheel by controlling the turning actuator according to a steering operation of the steering wheel;
reaction torque control that applies the reaction torque to the steering wheel by controlling the reaction actuator according to the steering operation of the steering wheel when the electric power is supplied from the main power supply to the actuators; and
power suppression processing that stops control of the reaction actuator when the electric power is supplied from the backup power supply to the actuators.

A second aspect further has the following feature in addition to the first aspect.

The reaction actuator includes a reaction motor connected to the steering wheel.

In the reaction torque control, the control device generates the reaction torque by controlling the reaction motor according to the steering operation.

In the power suppression processing, the control device stops control of the reaction motor.

During execution of the power suppression processing, the reaction motor is passively rotated according to rotation of the steering wheel.

A third aspect further has the following feature in addition to the second aspect.

During execution of the power suppression processing, the reaction motor generates a regenerative current according to the rotation of the steering wheel.

A fourth aspect further has the following feature in addition to the second or third aspect.

The reaction motor is driven by an inverter to generate the reaction torque.

In the reaction torque control, the control device controls the reaction motor by controlling the inverter according to the steering operation.

In the power suppression processing, the control device stops control of the inverter.

A fifth aspect further has the following feature in addition to the fourth aspect.

The inverter includes:
a power supply terminal connected to the power supply device;
an upper arm switching element connected between the power supply terminal and the reaction motor; and
a lower arm switching element connected between the reaction motor and a ground terminal.

In the power suppression processing, the control device holds the upper arm switching element in an OFF state and holds the lower arm switching element in an ON state.

A sixth aspect further has the following feature in addition to the fifth aspect.

In response to switching from the main power supply to the backup power supply, the control device gradually increases a duty ratio of the lower arm switching element to 100%.

A seventh aspect further has the following feature in addition to any of the first to sixth aspects.

In response to switching from the main power supply to the backup power supply, the control device gradually stops the reaction torque control.

According to the first aspect, when the electric power is supplied from the backup power supply, the control device executes the power suppression processing that stops control of the reaction actuator. Due to the power suppression processing, power consumption in the reaction actuator is suppressed. Since the power consumption in the reaction actuator is suppressed, it is possible to downsize the backup power supply. Downsizing the backup power supply is preferable in terms of the vehicle design. Moreover, since the power consumption in the reaction actuator is reduced, a duration for which the turning control using the turning actuator is available increases. This is preferable in terms of continuity of vehicle travel.

According to the second aspect, the reaction motor is connected to the steering wheel, and thus the reaction motor is passively rotated according to rotation of the steering wheel caused by the driver. At this time, the driver feels at least a mechanical friction force as a resistance. That is to say, during execution of the power suppression processing, at least the mechanical friction force acts as substitute for the reaction torque generated by the reaction torque control.

According to the third aspect, during execution of the power suppression processing, the reaction motor acts as a generator to generate the regenerative current according to the rotation of the steering wheel. In other words, during execution of the power suppression processing, a regenerative braking force acts as substitute for the reaction torque generated by the reaction torque control. This prevents a rapid rotation of the steering wheel and thus rapid turning of the wheel. As a result, the vehicle travel is stabilized.

According to the fourth aspect, in the power suppression processing, the control device stops the control of the inverter driving the reaction motor. As a result, the power suppression processing is realized and thus the same effects as in the first aspect can be obtained.

According to the fifth aspect, the same effects as in the fourth aspect can be obtained.

According to the sixth and seventh aspects, the driver's sense of strangeness is reduced.

EMBODIMENTS

Embodiments of the present disclosure will be described below with reference to the attached drawings.

1. VEHICLE OF STEER-BY-WIRE TYPE

Figure 1:
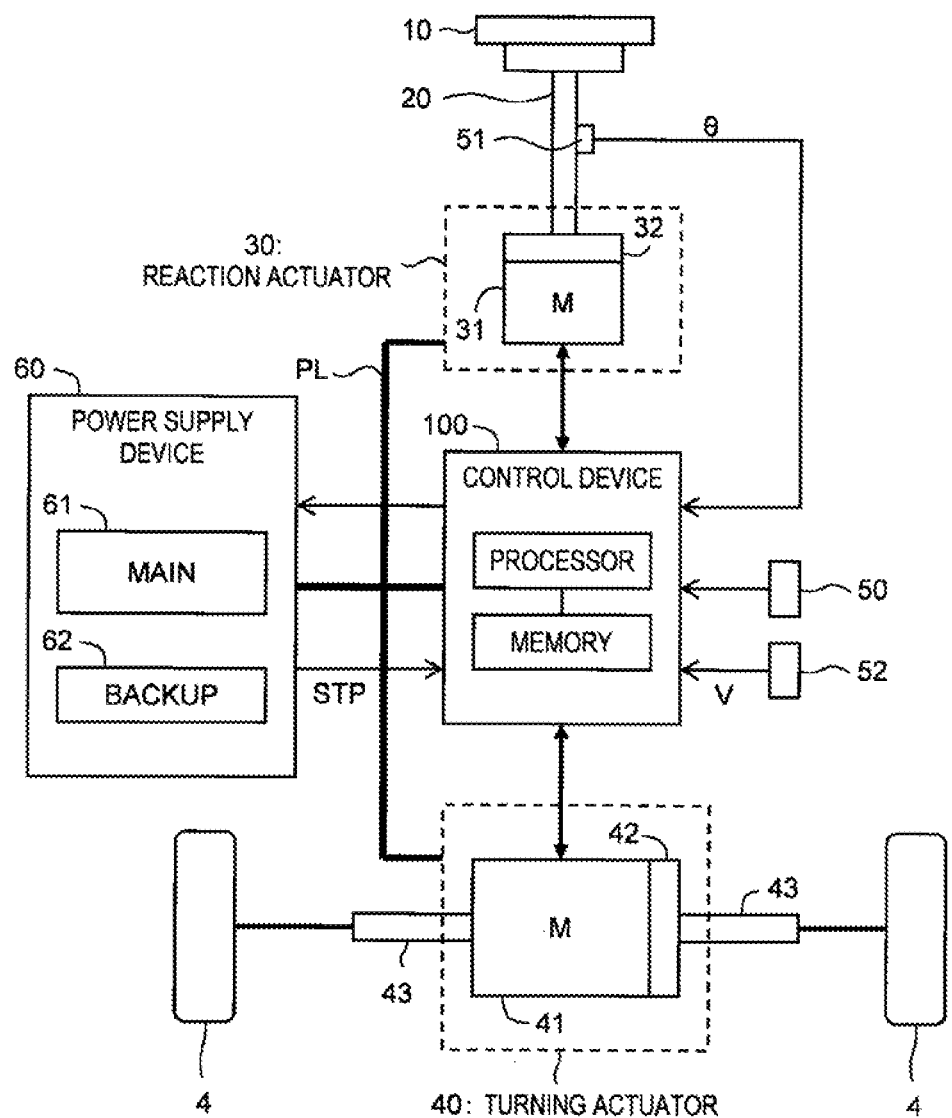
FIG. 1 is a block diagram schematically showing a configuration example of a vehicle of a steer-by-wire type according to an embodiment of the present disclosure.

FIG. 1 is a block diagram schematically showing a configuration example of a vehicle 1 of a steer-by-wire type according to the present embodiment. The vehicle 1 includes a wheel 4, a steering wheel 10, a steering shaft 20, a reaction actuator 30, a turning actuator 40, a sensor group 50, a power supply device 60, and a control device (controller) 100.

The steering wheel 10 is an operation member that a driver uses for a steering operation. The steering shaft 20 is coupled with the steering wheel 10 and rotates together with the steering wheel 10. The wheel 4 and the steering wheel 10 (the steering shaft 20) are mechanically disconnected from each other or capable of being mechanically connected with or disconnected from each other. In the following description, a situation where the wheel 4 and the steering wheel 10 are mechanically disconnected from each other.

The reaction actuator 30 applies a torque to the steering wheel 10. For example, the reaction actuator 30 includes a reaction motor 31 (e.g., a brushless motor). A rotor of the reaction motor 31 is connected to the steering shaft 20 through a speed reducer 32. Rotation of the reaction motor 31 makes it possible to apply the torque to the steering shaft 20 and thus to the steering wheel 10. An operation of the reaction actuator 30 (e.g., the reaction motor 31) is controlled by the control device 100.

The turning actuator 40 turns the wheel 4. Here, turning the wheel 4 means changing a direction of the wheel 4 for making a turn. For example, the turning actuator 40 includes a turning motor 41. A rotor or the turning motor 41 is connected to a turning bar 43 through a speed reducer 42. The turning bar 43 is coupled with the wheel 4. When the turning motor 41 rotates, its rotational motion is converted into a linear motion of the turning bar 43, and thereby the wheel 4 turns (i.e. changes its direction). That is, actuating the turning motor 41 makes it possible to turn the wheel 4. An operation of the turning actuator 40 (e.g., turning motor 41) is controlled by the control device 100.

The sensor group 50 detects a state of the vehicle 1. For example, the sensor group 50 includes a steering angle sensor 51 and a vehicle speed sensor 52.

The steering angle sensor 51 detects a steering angle θ (i.e., a steering wheel angle) of the steering wheel 10. The steering angle sensor 51 may be a rotation angle sensor that detects an angle of rotation of the reaction motor 31. In that case, the steering angle θ is calculated from the angle of rotation of the reaction motor 31. The steering angle sensor 51 sends information on the steering angle θ to the control device 100.

The vehicle speed sensor 52 detects a vehicle speed V being a speed of the vehicle 1. The vehicle speed sensor 52 sends information on the vehicle speed V to the control device 100. It is also possible to use a wheel speed sensor instead of the vehicle speed sensor 52 to calculate the vehicle speed V from a speed of rotation of each wheel 4.

The sensor group 50 may further include a steering torque sensor that detects a steering torque applied to the steering shaft 20. The sensor group 50 may further include a yaw rate sensor and an acceleration sensor.

The power supply device 60 supplies electric power to each component (i.e., the reaction actuator 30, the turning actuator 40, the control device 100, and so forth) of the vehicle 1. In the example shown in FIG. 1, the power supply device 60 is connected to each component through a power supply line PL and supplies the electric power to each component through the power supply line PL. The reaction actuator 30 and the turning actuator 40 described above are operated by the electric power supplied from the power supply device 60.

In the present embodiment, the power supply device 60 includes a main power supply 61 and a backup power supply

62. For example, the main power supply 61 includes generator (alternator). The backup power supply 62 is a power supply used as a backup when an abnormality (e.g., failure, a voltage drop, and the like) occurs in the main power supply 61. For example, the backup power supply 62 includes a battery (an electric storage device).

The power supply device 60 sends power supply state information STP indicating a state of the power supply device 60 to the control device 100. The power supply state information STP includes an operation state and an output voltage of the main power supply 61, an operation state, an output voltage, a remaining power of the backup power supply 62, and so forth.

The control device 100 (i.e., the controller) controls the vehicle 1 according to the present embodiment. The control device 100 includes a microcomputer provided with a processor and a memory. The microcomputer is also called an ECU (Electronic Control Unit). A variety of processing by the control device 100 is realized by the processor executing a control program stored in the memory. Hereinafter, processing executed by the control device 100 will be described in detail.

2. PROCESSING OF CONTROL DEVICE 2-1. Normal Mode

First, a case where the main power supply 61 is normal will be considered. In that case, the electric power is supplied from the main power supply 61 to the reaction actuator 30 and the turning actuator 40. The reaction actuator 30 and the turning actuator 40 are operated by the electric power supplied from the main power supply 61.

The control device 100 operates in a normal mode. In the normal mode, the control device 100 executes "turning control" and "reaction torque control" according to a steering operation of the steering wheel 10 performed by the driver.

In the turning control, the control device 100 turns (i.e., changes a direction of) the wheel 4 by controlling the turning actuator 40 according to the steering operation of the steering wheel 10. For example, the control device 100 calculates a target turn angle based on the steering angle θ and the vehicle speed V. An actual turn angle of the wheel 4 is calculated from, for example, an angle of rotation of the turning motor 41. The control device 100 controls the operation of the turning motor 41 such that the actual turn angle of the wheel 4 follows the target turn angle. More specifically, the control device 100 generates a control signal for driving the turning motor 41 based on a deviation between the actual turn angle of the wheel 4 and the target turn angle. The turning motor 41 is driven according to the control signal, and the wheel 4 is turned by the rotation of the turning motor 41.

In the reaction torque control, the control device 100 applies a reaction torque to the steering wheel 10 by controlling the reaction actuator 30 according to the steering operation of the steering wheel 10. The reaction torque is a simulated torque corresponding to steering reaction that the driver feels during the steering operation. For example, the control device 100 calculates a target reaction torque (spring component) corresponding to a self-aligning torque applied to the wheels 4, based on the steering angle θ and the vehicle speed V. The target reaction torque may further include a damping component according to a steering speed dθ/dt. The control device 100 controls the operation of the reaction motor 31 so as to generate the target reaction torque. More specifically, the control device 100 generates a control signal for driving the reaction motor 31 based on the target reaction torque. The reaction motor 31 is driven according to the control signal, thereby generating the reaction torque.

It should be noted that the control device 100 may separately include a first control device for controlling the turning actuator 40 and a second control device for controlling the reaction actuator 30. In that case, the first control device and the second control device are communicably connected to each other and exchange necessary information with each other.

2-2. Power Supply Monitoring Processing

The control device 100 receives the power supply state information STP indicating the state of the power supply device 60. The power supply state information STP includes the operation state and the output voltage of the main power supply 61, the operation state, the output voltage, the remaining power of the backup power supply 62, and so forth.

The control device 100 detects an abnormality (e.g., failure, a voltage drop, and the like) of the main power supply 61 based on the power supply state information STP. For example, the control device 100 monitors the output voltage (power supply voltage) of the main power supply 61. When the output voltage of the main power supply 61 decreases and falls below a predetermined threshold, the control device 100 determines that an abnormality occurs in the main power supply 61. As another example, the main power supply 61 may have a self-diagnostic function. When an abnormality is detected by the self-diagnostic function, the abnormality detection is notified to the control device 100 through the power supply state information STP.

2-3. Backup Mode

When an abnormality occurs in the main power supply 61, the control device 100 operates in a backup mode. First, the control device 100 performs switching from the main power supply 61 to the backup power supply 62. For example, the control device 100 electrically disconnects the main power supply 61 from the power supply line PL, and instead electrically connects the backup power supply 62 to the power supply line PL. The backup power supply 62 supplies the electric power to the reaction actuator 30 and the turning actuator 40.

Figure 2:
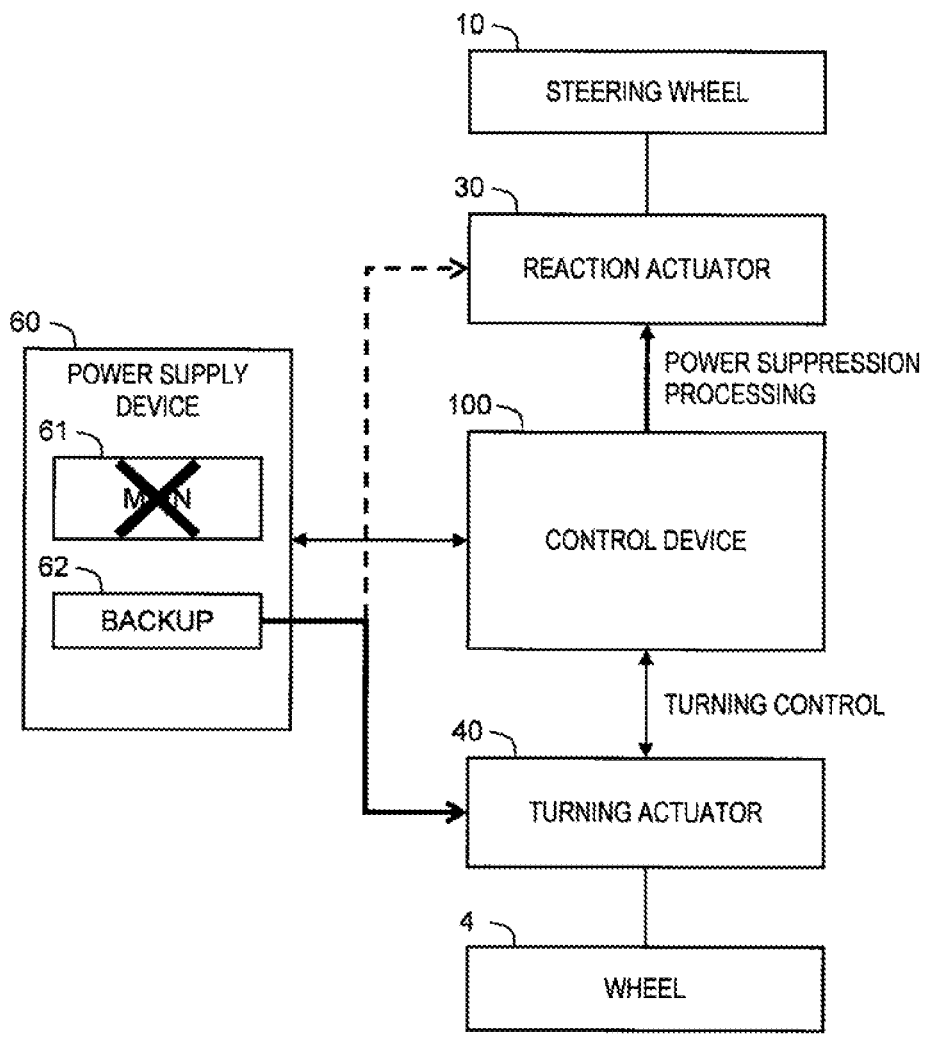
FIG. 2 is a block diagram for explaining a backup mode according to the embodiment of the present disclosure.

FIG. 2 is a block diagram for explaining the backup mode. When the electric power is supplied from the backup power supply 62 to the reaction actuator 30 and the turning actuator 40, it is preferable to suppress power consumption. However, the turning of the wheel 4 by the turning control is important from a viewpoint of the vehicle travel. Therefore, the control device 100 continues the turning control according to the steering operation of the steering wheel 10, as in the case of the normal mode. That is, the control device 100 controls the turning actuator 40 according to the steering operation of the steering wheel 10.

Instead, the control device 100 executes "power suppression processing" that suppresses power consumption in the reaction actuator 30 as compared with the case of the normal mode. More specifically, in the power suppression processing, the control device 100 stops active control of the reaction actuator 30 (e.g., the reaction motor 31). For example, the above-described reaction torque control according to the steering operation of the steering wheel 10 is not executed. Since the control of the reaction actuator 30 is stopped, the power consumption in the reaction actuator 30 is suppressed.

During execution of the power suppression processing, the reaction motor 31 is not controlled by the control device 100. However, since the reaction motor 31 is connected to the steering wheel 10, the reaction motor 31 is passively rotated according to rotation of the steering wheel 10 caused by the driver. At this time, the driver feels at least a mechanical friction force as a resistance. That is to say, during execution of the power suppression processing, at least the mechanical friction force acts as substitute for the reaction torque generated by the reaction torque control.

During execution of the power suppression processing, the reaction motor 31 preferably acts as a generator to generate a regenerative current according to the rotation of the steering wheel 10. In that case, the driver feels a greater load than a mere mechanical friction force. In other words, during execution of the power suppression processing, a regenerative braking force acts as substitute for the reaction torque generated by the reaction torque control. This prevents a rapid rotation of the steering wheel 10 and thus rapid turning of the wheel 4. As a result, the vehicle travel is stabilized.

According to the present embodiment, as described above, when the electric power is supplied from the backup power supply 62, the control device 100 executes the power suppression processing that stops the control of the reaction actuator 30. Due to the power suppression processing, the power consumption in the reaction actuator 30 is suppressed. Since the power consumption in the reaction actuator 30 is suppressed, it is possible to downsize the backup power supply 62. Downsizing the backup power supply 62 is preferable in terms of the vehicle design.

Moreover, since the power consumption in the reaction actuator 30 is reduced, a duration for which the turning control using the turning actuator 40 is available increases. This is preferable in terms of continuity of the vehicle travel. It can be said that the present embodiment gives priority to the power supply to the turning actuator 40 and thereby ensures the turning control as much as possible.

2-4. Process Flow Example

Figure 3:
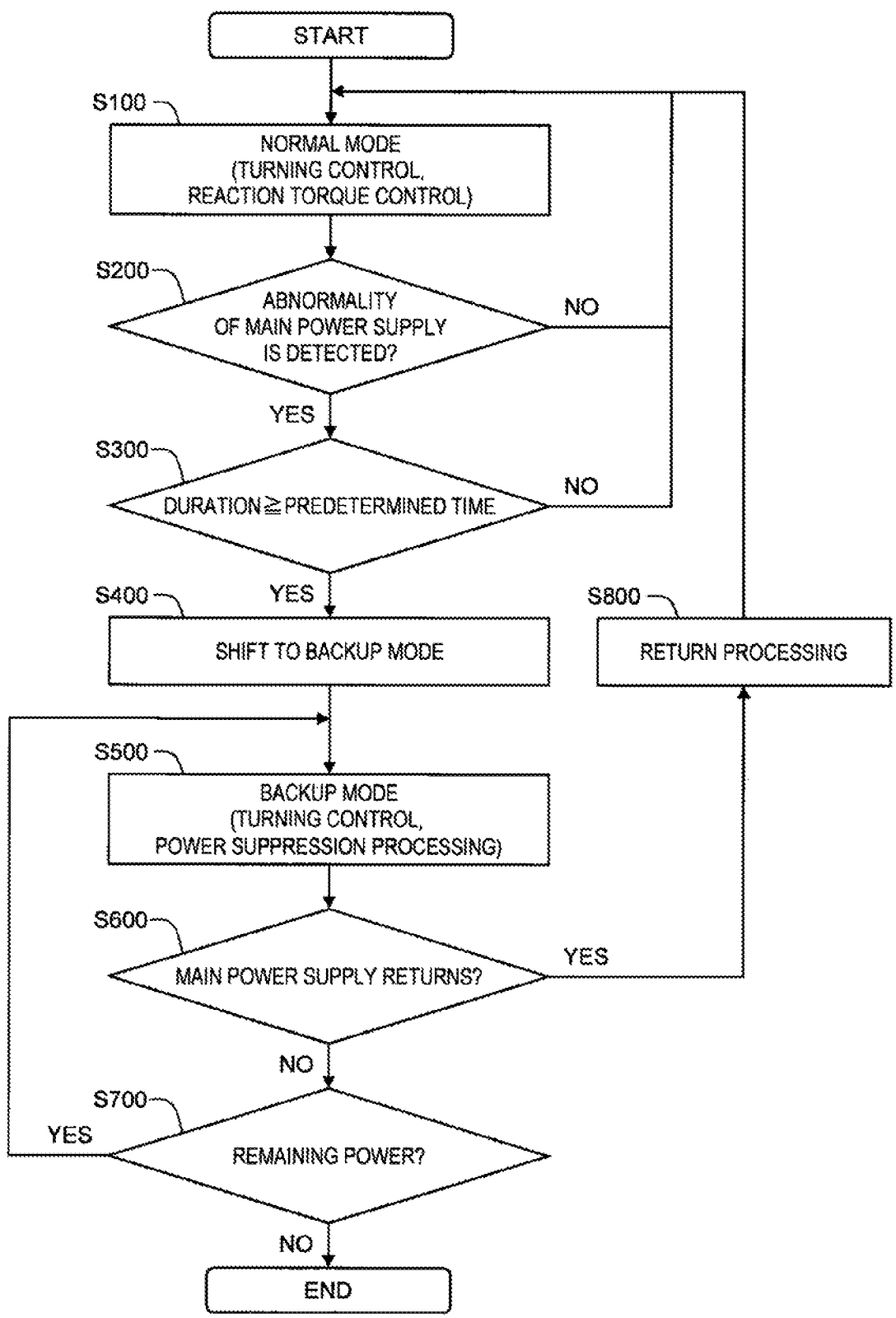
FIG. 3 is a flow chart showing an example of processing by a control device according to the embodiment of the present disclosure.

FIG. 3 is a flow chart showing an example of processing by the control device 100 according to the present embodiment.

In Step S100, the control device 100 operates in the normal mode. In the normal mode, the control device 100 executes the turning control and the reaction torque control according to the steering operation of the steering wheel 10 performed by the driver.

In Step S200, the control device 100 determines, based on the power supply state information STP, whether or not an abnormality occurs in the main power supply 61. When the abnormality of the main power supply 61 is detected (Step S200; Yes), the control device 100 measures a duration of the abnormality detection (Step S300). When the abnormality detection continues for more than a predetermined period of time (Step S300; Yes), the control device 100 definitely determines that the abnormality occurs in the main power supply 61. In that case, the processing proceeds to Step S400. Otherwise (Step S200; No, Step S300; No), the processing returns to Step S100.

In Step S400, the control device 100 makes a shift from the normal mode to the backup mode. More specifically, the control device 100 performs switching from the main power supply 61 to the backup power supply 62. In response to the switching from the main power supply 61 to the backup power supply 62, the control device 100 stops the reaction torque control. At this time, the control device 100 may gradually stop the reaction torque control by gradually decreasing a control amount of the reaction torque control. This can reduce the driver's sense of strangeness.

In Step S500, the control device 100 operates in the backup mode. In the backup mode, the control device 100 continues the turning control using the turning actuator 40. Meanwhile, the control device 100 executes the power suppression processing that stops the control of the reaction actuator 30. Due to the power suppression processing, the power consumption in the reaction actuator 30 is suppressed. A specific example of the power suppression processing will be described later.

In Step S600, the control device 100 determines, based on the power supply state information STP, whether or not the main power supply 61 returns. For example, when the output voltage of the main power supply 61 returns to more than a predetermined threshold, the control device 100 determines that the main power supply 61 returns. When the main power supply 61 returns (Step S600; Yes), the processing proceeds to Step S800. Otherwise (Step S600; No), the processing proceeds to Step S700.

In Step S700, the control device 100 checks a remaining power of the backup power supply 62 based on the power supply state information STP. When the electric power of the backup power supply 62 remains (Step S700; Yes), the processing returns to Step S500. On the other hand, when the backup power supply 62 comes close to running out the electric power (Step S700; No), the control device 100 issues an alert to the driver and terminates the turning control. The control device 100 may further stop the vehicle 1 at a safe location.

In Step S800, the control device 100 executes return processing for returning to the normal mode. More specifically, the control device 100 performs switching from the backup power supply 62 to the main power supply 61. In response to the switching from the backup power supply 62 to the main power supply 61, the control device 100 terminates the power suppression processing and restarts the reaction torque control. At this time, the control device 100 quickly increases the control amount of the reaction torque control. Since a steering feeling quickly returns to normal, the driver's sense of strangeness is reduced.

3. SPECIFIC EXAMPLE OF POWER SUPRESSION PROCESSING

According to the present embodiment, as described above, when the electric power is supplied from the backup power supply 62, the control device 100 executes the power suppression processing that stops the control of the reaction motor 31. Hereinafter, a specific example of the power suppression processing will be described.

3-1. Inverter Configuration

Figure 4:
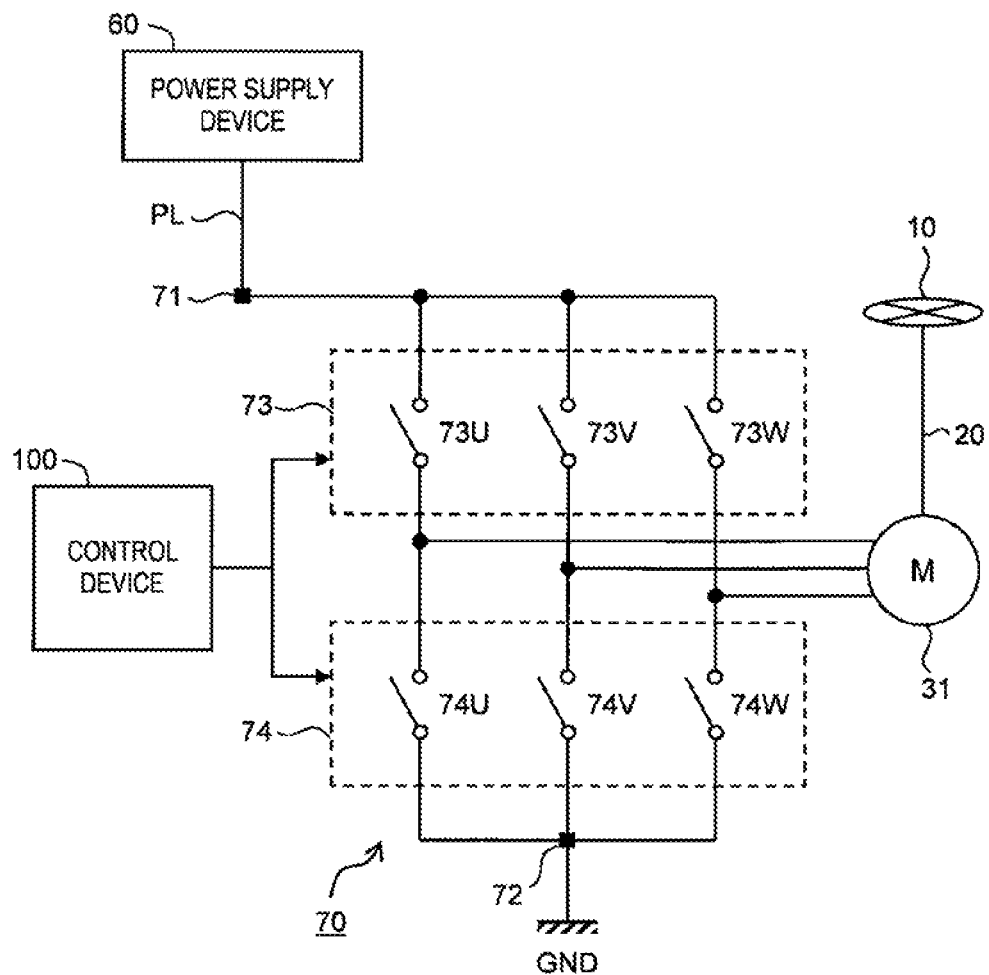
FIG. 4 is a schematic diagram showing a configuration of an inverter for driving a reaction motor according to the embodiment of the present disclosure.

FIG. 4 is a schematic diagram showing a configuration of an inverter 70 for driving the reaction motor 31. The inverter 70 may be included in the control device 100 or may be included in the reaction actuator 30. In either case, the inverter 70 is controlled by the control device 100 to drive the reaction motor 31.

As shown in FIG. 4, the inverter 70 includes a power supply terminal 71, a ground terminal 72, an upper arm switching element 73, and a lower arm switching element 74. The power supply terminal 71 is connected to the power supply device 60 through the power supply line PL. The electric power is supplied from the power supply device 60 to the power supply terminal 71. The ground terminal 72 is grounded.

The upper arm switching element 73 is connected between the power supply terminal 71 and the reaction motor 31, and turns ON/OFF electrical connection between the power supply terminal 71 and the reaction motor 31. On the other hand, the lower arm switching element 74 is connected between the ground terminal 72 and the reaction motor 31, and turns ON/OFF electrical connection between the ground terminal 72 and the reaction motor 31. More specifically, the upper arm switching element 73 includes switching elements 73U, 73V, and 73W corresponding to U-phase, V-phase, and W-phase, respectively. Similarly, the lower arm switching element 74 includes switching elements 74U, 74V, and 74W corresponding to U-phase, V-phase, and W-phase, respectively. Each switching element is exemplified by an IGBT, a MOSFET, and the like.

The control device 100 ON/OFF controls the upper arm switching element 73 and the lower arm switching element 74. More specifically, the control device 100 performs PWM (Pulse Width Modulation) control of the upper arm switching element 73 and the lower arm switching element 74 such that a three-phase alternating current is supplied to the reaction motor 31. As a result, the reaction motor 31 is driven to generate the torque.

In particular, in the reaction torque control, the control device 100 controls the reaction motor 31 by controlling the inverter 70 according to the steering operation of the steering wheel 10. For example, the control device 100 determines a target reaction torque based on the steering angle θ and the vehicle speed V, and calculates a current command according to the target reaction torque. The control device 100 generates PWM control signals according to the current command, and outputs the PWM control signals to the inverter 70. The upper arm switching element 73 and the lower arm switching element 74 are ON/OFF controlled by the PWM control signals. As a result, the reaction motor 31 is driven to generate the reaction torque.

3-2. Example of Power Suppression Processing

Figure 5:
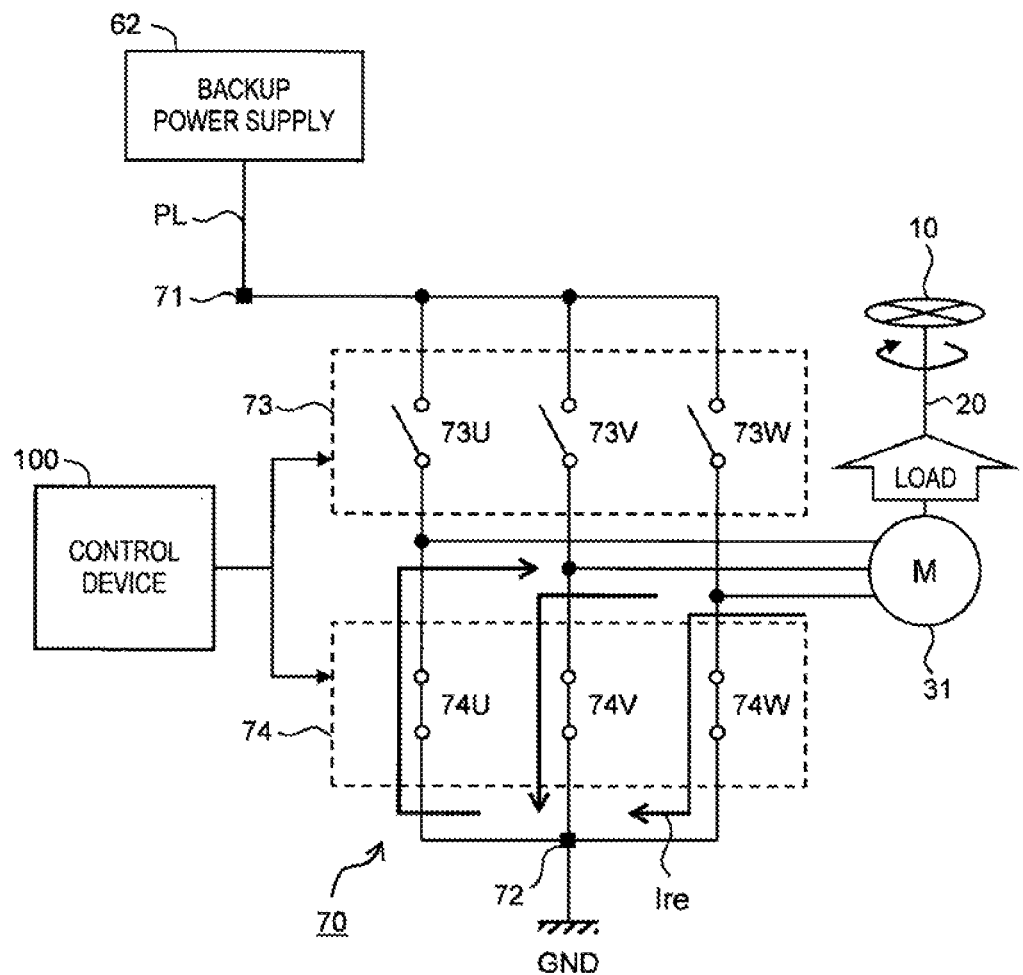
FIG. 5 is a schematic diagram for explaining an example of power suppression processing according to the embodiment of the present disclosure.

FIG. 5 is a schematic diagram for explaining an example of the power suppression processing. The power supply terminal 71 is connected to the backup power supply 62. In the power suppression processing, the control device 100 stops the control of the inverter 70. In the example shown in FIG. 5, the control device 100 holds the upper arm switching element 73 in an OFF state and holds the lower arm switching element 74 in an ON state. Since the inverter 70 is not controlled, the reaction motor 31 also is not controlled. As a result, the power consumption in the reaction motor 31 is suppressed.

It should be noted that the reaction motor 31 is connected to the steering wheel 10, and thus the reaction motor 31 is passively rotated according to rotation of the steering wheel 10 caused by the driver. In that case, the reaction motor 31 acts as a generator to generate a regenerative current Ire according to the rotation of the steering wheel 10. In the example shown in FIG. 5, the regenerative current Ire flows between the reaction motor 31 and the ground terminal 72 through the lower arm switching element 74. A path of the regenerative current Ire varies depending on an angle of rotation of the reaction motor 31. When the regenerative current Ire flows, the driver feels a greater load than a mere mechanical friction force. In other words, the regenerative braking force acts as substitute for the reaction torque generated by the reaction torque control. This prevents a rapid rotation of the steering wheel 10 and thus rapid turning of the wheel 4. As a result, the vehicle travel is stabilized.

3-3. Example of Shift Processing

Figure 6:
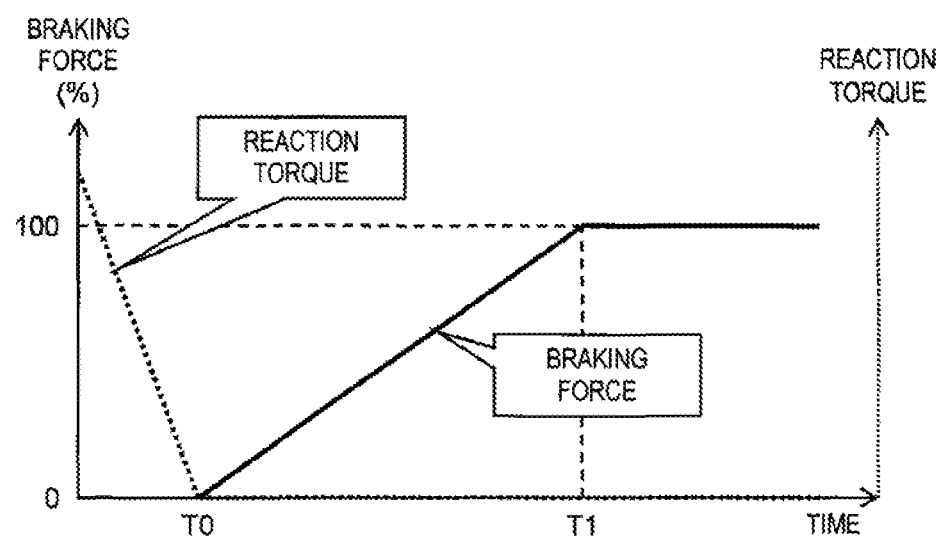
FIG. 6 is a timing chart for explaining an example of a shift from a normal mode to the backup mode in the embodiment of the present disclosure.

FIG. 6 is a timing chart for explaining an example of the shift from the normal mode to the backup mode (Step S400 in FIG. 3). A horizontal axis represents time. A vertical axis represents the reaction torque generated by the reaction torque control or the braking force generated by the power suppression processing.

The control device 100 performs the switching from the main power supply 61 to the backup power supply 62. In response to the switching from the main power supply 61 to the backup power supply 62, the control device 100 stops the reaction torque control and starts the power suppression processing.

In the example shown in FIG. 6, the control device 100 gradually decreases the control amount of the reaction torque control. For example, the control device 100 gradually decreases a gain of the reaction torque control from a default value. As a result, the reaction torque control is gradually stopped, and thus the driver's sense of strangeness is reduced.

At a timing T0, the reaction torque control ends. Instead, the control device 100 starts the power suppression processing shown in FIG. 5. At this time, the control device 100 gradually increases the braking force generated by the power suppression processing. More specifically, the control device 100 gradually increases a duty ratio of the lower arm switching element 74 from an initial value (e.g., 0%) to 100%. At a timing T1, the duty ratio becomes 100%, that is, the lower arm switching element 74 is held (fixed) in the ON state. In this manner, the braking force gradually increases, and thus the driver's sense of strangeness is reduced.

Figure 7:
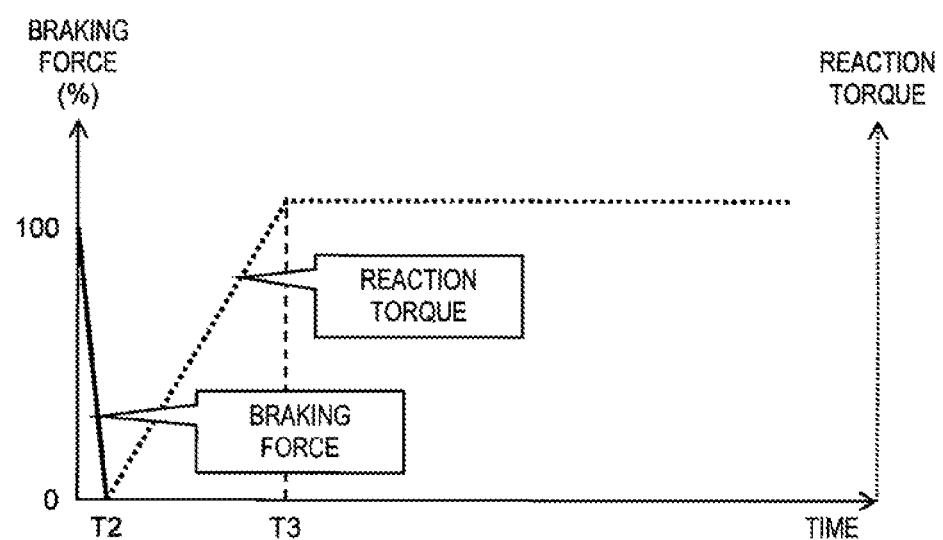
FIG. 7 is a timing chart for explaining an example of a return from the backup mode to the normal mode in the embodiment of the present disclosure.

FIG. 7 is a timing chart for explaining an example of the return from the backup mode to the normal mode (Step S800 in FIG. 3). The control device 100 performs the switching from the backup power supply 62 to the main power supply 61. In response to the switching from the backup power supply 62 to the main power supply 61, the control device 100 terminates the power suppression processing and restarts the reaction torque control. At this time, the control device 100 quickly increases the control amount of the reaction torque control. For example, the control device 100 quickly increases the gain of the reaction torque control to the default value. Since the steering feeling quickly returns to normal, the driver's sense of strangeness is reduced.

3-4. Modification Examples of Power Supression Processing

In the power suppression processing, the control device 100 may hold the upper arm switching element 73 in an ON state and hold the lower arm switching element 74 in an OFF state. As a result, the same effects can be obtained.

In the power suppression processing, the control device 100 may hold both the upper arm switching element 73 and the lower arm switching element 74 in an OFF state. Even in this case, at least the power suppression effect can be obtained.

What is claimed is:
1. A control device for a steer-by-wire vehicle,
the steer-by-wire vehicle comprising:
   a power supply device; and
   actuators operated by electric power supplied from the power supply device,
the actuators comprising:
   a turning actuator configured to turn a wheel of the steer-by-wire vehicle; and
   a reaction actuator configured to apply a reaction torque to a steering wheel of the steer-by-wire vehicle,
the power supply device comprising:
   a main power supply; and
   a backup power supply configured to supply the electric power to the actuators when an abnormality occurs in the main power supply, the control device being configured to execute:
- turning control that turns the wheel by controlling the turning actuator according to a steering operation of the steering wheel;
- reaction torque control that applies the reaction torque to the steering wheel by controlling the reaction actuator according to the steering operation of the steering wheel when the electric power is supplied from the main power supply to the actuators; and
- power suppression processing that stops control of the reaction actuator when the electric power is supplied from the backup power supply to the actuators.

2. The control device according to claim 1, wherein
the reaction actuator includes a reaction motor connected to the steering wheel,
in the reaction torque control, the control device generates the reaction torque by controlling the reaction motor according to the steering operation,
in the power suppression processing, the control device stops control of the reaction motor, and
during execution of the power suppression processing, the reaction motor is passively rotated according to rotation of the steering wheel.

3. The control device according to claim 2, wherein
during execution of the power suppression processing, the reaction motor generates a regenerative current according to the rotation of the steering wheel.

4. The control device according to claim 2, wherein
the reaction motor is driven by an inverter to generate the reaction torque,
in the reaction torque control, the control device controls the reaction motor by controlling the inverter according to the steering operation, and
in the power suppression processing, the control device stops control of the inverter.

5. The control device according to claim 4, wherein
the inverter includes:
- a power supply terminal connected to the power supply device;
- an upper arm switching element connected between the power supply terminal and the reaction motor; and
- a lower arm switching element connected between the reaction motor and a ground terminal, and in the power suppression processing, the control device holds the upper arm switching element in an OFF state and holds the lower arm switching element in an ON state.

6. The control device according to claim 5, wherein
in response to switching from the main power supply to the backup power supply, the control device gradually increases a duty ratio of the lower arm switching element to 100%.

7. The control device according to claim 1, wherein
in response to switching from the main power supply to the backup power supply, the control device gradually stops the reaction torque control.

* * * * *